Dec. 18, 1962   R. I. MEADER ETAL   3,068,826
WIRE FEED FOR SOLDERING IRON
Filed June 29, 1959
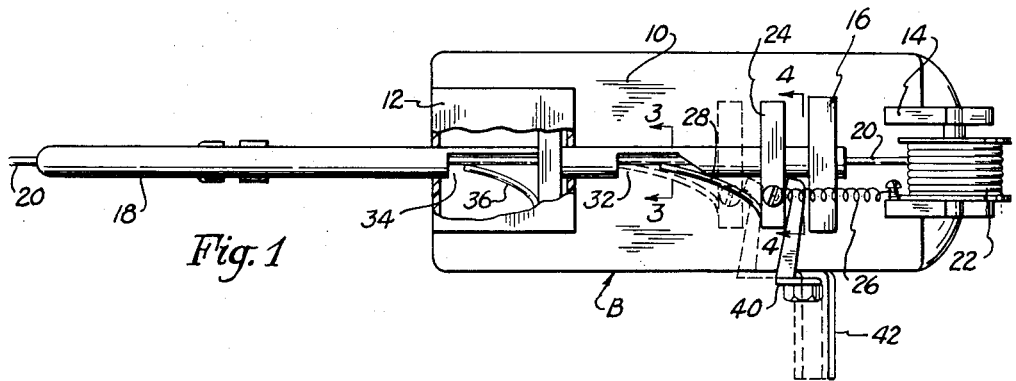
Fig. 1
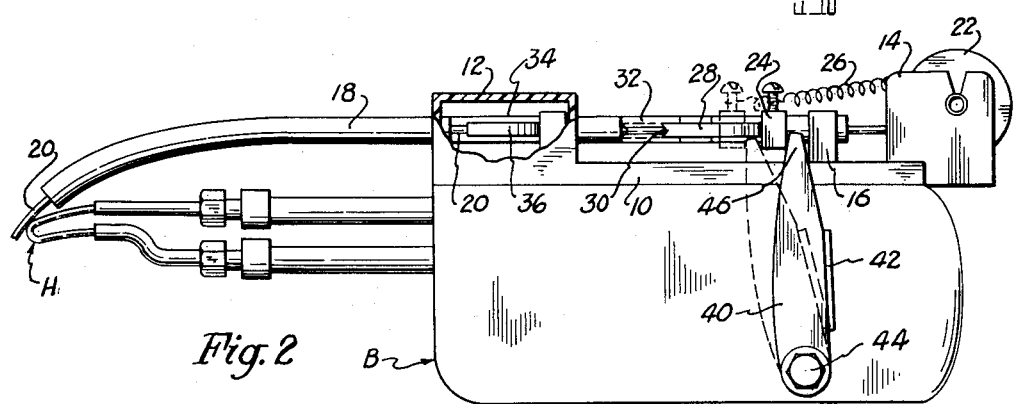
Fig. 2
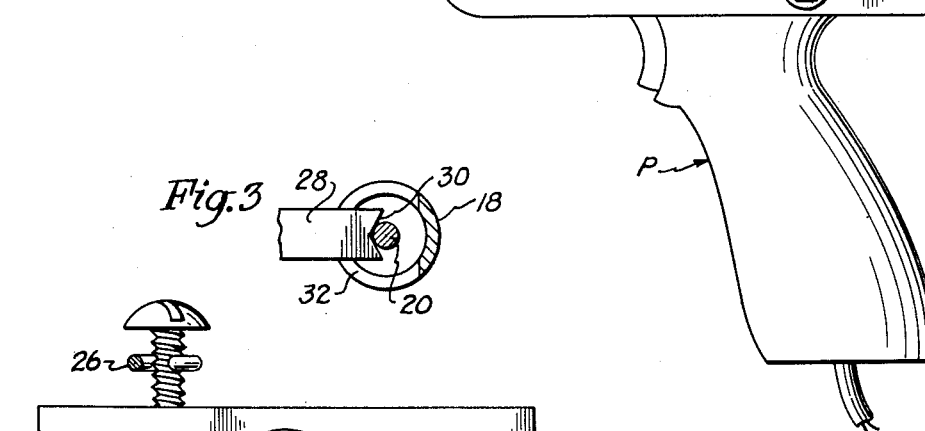
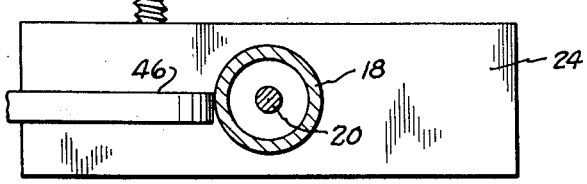
Fig. 3
Fig. 4
INVENTORS
Ralph I. Meader
Malcolm S. Meader
BY
Bailey, Stephens & Huettig
ATTORNEYS

3,068,826
WIRE FEED FOR SOLDERING IRON
Ralph I. Meader and Malcolm S. Meader, both of
3301 Woodbine St., Chevy Chase 15, Md.
Filed June 29, 1959, Ser. No. 823,554
1 Claim. (Cl. 113—109)

This invention relates to a soldering iron and, in particular, is directed to a solder wire feed attachment to a soldering iron.

Many attempts have been made to produce a reasonably satisfactory soldering iron which holds and feeds the solder wire. Such soldering irons have not been altogether practical either because they are of too expensive a construction or have not been able to feed the solder wire to the soldering iron head in an efficient manner.

The object of this invention is to produce a simple inexpensive attachment for a soldering iron by means of which the solder wire can be positively fed at any given rate to the soldering iron head.

The means by which the objects of the invention are obtained are disclosed more fully with reference to the accompanying drawings, in which:

FIGURE 1 is a plan view of a soldering iron having the wire feeding attachment thereon;

FIGURE 2 is a front elevational view of FIGURE 1;

FIGURE 3 is a cross-sectional view on the line 3—3 of FIGURE 1; and

FIGURE 4 is a cross-sectional view on the line 4—4 of FIGURE 1.

For the purpose of the disclosure of this invention, an electric soldering iron is illustrated which consists of a body B having a head H and a pistol grip P. Secured to the top of the body B is a plate 10 having a housing 12 at the front end and a stand 14 at the rear end. In between is an apertured plate 16. A tube 18 has its rear end extending through the aperture in plate 16 and extends through aligned apertures in housing 12 and is continued to a point immediately adjacent the end of head H, the tube being curved in order to reach head H. The solder wire 20 extends from a spool 22 mounted in the stand 14 through tube 18 and outwardly of the forward end thereof so as to be in contact with and heated by the tip of the soldering iron head.

A crossarm 24 is slidably mounted on tube 18 with the tube extending through a hole in crossarm 24. A coil spring 26 has one end attached to crossarm 24 and the opposite end secured to stand 14 for the purpose of urging crossarm 24 toward stand 14. Also attached to crossarm 24 is one end of a resilient leaf spring 28. The opposite free end of the leaf spring 28 has a triangular notch 30. This notched end extends through a cut-out section 32 in tube 18 and engages wire 20.

Tube 18 also has a second cut-out portion 34. A second leaf spring 36 similar to spring 28 has one end fastened to housing 12 and its opposite end extends through cut-out 34 and into engagement with wire 20.

A lever 40 having a thumb plate 42 is pivotally secured to body B by bolt 44. The upper end 46 of lever 40 contacts crossarm 24 but is not secured to this crossarm.

In operation, the user of the soldering gun holds it by the pistol grip P. When it is desired to feed out wire 20, the operator pushes plate 42 with his thumb and thus rotates lever 40 toward head H. The upper end 46 of lever 40 bears against crossarm 24 and pushes the crossarm along tube 18 toward head H. The notched end 30 of spring 28 engages wire 20 by digging into the wire 20 which pushes the wire 20 into the tube and outwardly toward head H. When lever 40 is released, spring 26 withdraws crossarm 24 to its starting position. In this movement, spring 28 will slide backwards over the surface of wire 20. Backward movement of the wire is prevented by spring 36, the free end of which will dig into the wire if wire 20 starts to move backwardly. The resiliency of springs 28 and 36 keeps them in constant contact with the wire. Ordinarily, the tube 18 is only slightly larger than wire 20 so that if the wire bends under the pressure of springs 28 and 36, the side of the tube acts as an abutment so that the wire cannot escape being engaged and dug into by either spring 28 or 36. This ensures that the free end of the wire is always held in position adjacent head H so that it can be melted and applied to a workpiece.

Having now described the means by which the objects of the invention are obtained, we claim:

In combination with a soldering iron having a body and a soldering iron head projecting from said body, the improvement comprising a single piece rigid solder iron feeding tube immovably attached to said body and extending to adjacent the free end of said head, a solder wire slidably contained in said tube, a first cut-out in said tube, a crossarm slidably mounted for straight-line movement on the outer surface of said tube adjacent said first cut-out, a first leaf spring having one end fastened to said crossarm and having its opposite end extending toward said head and into said cut-out for engaging said wire, a lever pivotally secured to said body and engaging without being secured to said crossarm for pushing said crossarm and first leaf spring to advance said wire toward said head, spring means attached to said crossarm and body for returning said crossarm to starting position upon release of said lever, a second cut-out in said tube, a second leaf spring secured to said body and extending into said second cut-out in the direction of said head and having its free end engaging said wire for preventing said wire from moving back from said head, and said tube being slightly greater in diameter than said wire and forming an abutment for said wire as engaged by each leaf spring, the wire engaging end of each leaf spring having a triangular notch formed therein within which said wire is engaged.

References Cited in the file of this patent

UNITED STATES PATENTS

| | | |
|---|---|---|
| 1,631,063 | Rognley | May 31, 1927 |
| 1,951,545 | Carson | Mar. 20, 1934 |
| 2,093,527 | Petti | Sept. 21, 1937 |
| 2,604,064 | Sefton | July 22, 1952 |
| 2,604,571 | Naulty et al. | July 22, 1952 |
| 2,843,073 | Voss et al. | July 15, 1958 |
| 2,987,023 | Cortner | June 6, 1961 |